(12) United States Patent
Wada

(10) Patent No.: US 6,466,338 B1
(45) Date of Patent: Oct. 15, 2002

(54) IMAGE PICKUP UNIT

(75) Inventor: Keisuke Wada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/182,667

(22) Filed: Oct. 30, 1998

(30) Foreign Application Priority Data

Jan. 23, 1998 (JP) .......................................... 10-011310

(51) Int. Cl.[7] .................................................. H04N 1/04
(52) U.S. Cl. ..................................... 358/471; 358/483
(58) Field of Search ................................ 358/483, 482, 358/496, 497, 487, 474, 475, 509, 506, 505, 471; 250/208.1

(56) References Cited

U.S. PATENT DOCUMENTS

| | | | | |
|---|---|---|---|---|
| 5,270,840 A | * | 12/1993 | Ogata et al. | 358/482 |
| 5,434,681 A | * | 7/1995 | Imamura et al. | 358/471 |
| 5,701,505 A | * | 12/1997 | Yamashita et al. | 358/514 |
| 6,014,231 A | * | 1/2000 | Sawase et al. | 358/482 |

* cited by examiner

Primary Examiner—Cheukfan Lee
(74) Attorney, Agent, or Firm—Wenderoth, Lind & Ponack, L.L.P.

(57) ABSTRACT

A compact specular reflection type image pickup unit has a light source 11 mounted at a position a specified distance away from the target surface of an original P, and the light source 11 emits an outgoing light ph 11 at an angle θ to the normal to the target surface. The emitted light ph 11 passes through a glass plate 12 and is incident on the focal points f of a rod lens array 13 on the target surface of the original P at an incidence angle θ, and is reflected at a reflection angle θ as a reflected light rf11. The reflected light rf11 is converged by the rod lens array 13, received by an image pickup element 14 and converted into electric signals. A board 14a is arranged such that the light-receiving faces of the image-pickup elements are parallel with the target object surface of the original P, and the board 14a is fixed to the bottom wall of a housing 15A. As a consequence, the height of the housing 15A is smaller by L1 than that of the housing 5.

8 Claims, 4 Drawing Sheets

IMAGE PICKUP UNIT

BACKGROUND OF THE INVENTION

1. Field of the Invention

The present invention relates to an image pickup unit, mounted in a facsimile or a cash dispenser, for taking an image of the surface of an object (more specifically, printed characters on an original or embossed characters on a cash card, for example).

2. Prior Art

FIG. 2 is a sectional view showing an example of a conventional specular reflection type image pickup unit having a image-forming means, such as a rod lens, arranged at such a position as to receive the maximum quantity of reflected light.

In this image pickup unit, a light source 1 is provided at a position a specified distance away from the target surface of the object, such as an original P. The light source 1 is formed of a plurality of light emitters arranged in a row, and emits light ph1 in a linear form at a specified angle $\theta(0°<\theta<90°)$ to a direction normal to the target surface of the original P. After passing through a glass plate 2, the emitted light ph1 is incident on the focal points f of a rod lens array 3 on the target surface of the original P at an incidence angle $\theta$. The incident light is reflected by the target surface chiefly as a maximum quantity of reflected light rf1 at a reflection angle $\theta$. For this purpose, the rod lens array 3 is so arranged as to hold the angle $\theta$. Therefore, when the reflected light rf1 is converged by the rod lens array 3, an image is formed at an image-forming position indicated by a conjugate distance T. Note that the conjugate distance T is the characteristic value of the rod lens array 3 that shows the distance between the target surface of the original P and the image-forming position. The light-receiving faces of image pickup elements 4 are located at this image-forming position. The reflected light rf1 which formed the image plane is converted into electric signals by an array of image pickup elements 4, and the electric signals pass through a board 4a and are sent to an image processing system, for example, to undergo a specified process. The light source 1 is mounted on the board 1a, and the board 1a is located at a proper position and supported in a housing 5. The image pickup elements 4 are fixed through the intermediary of a board 4a to the inside walls of the housing 5 such that the light-receiving faces are normal to the propagating direction of the reflected light rf1.

As has been described, in the specular reflection type image pickup unit, the light source 1 and the rod lens array 3 are arranged at equal angles $\theta$ to the normal to the target surface of the original P. Therefore, since the image pickup elements can receive the maximum quantity of the reflected light, the embossed characters of a cash card, for example, can be displayed with proper contrast on the display screen.

However, the conventional image pickup unit in FIG. 2 has a problem. Specifically, the problem is the large width of the housing attributable to the inclined mounting in the housing 5 of the board 4a on which the image pickup elements 4 are mounted.

Meanwhile, FIG. 3 is a sectional view showing an example of the irregular reflection type image pickup unit whose size was reduced by the sacrifice of the received light quantity of the image-forming means. The same parts as those in FIG. 2 are designated by the common reference numerals.

In this image pickup unit in FIG. 3, the rod lens array 3 is arranged normal to the target surface of the original P, and receives the reflected light rf1. Therefore, the width dimension of the housing 5A can be made smaller than that of the housing 5 in FIG. 2. However, due to the smaller received quantity of the reflected light rf1, this image pickup unit is unable to produce a distinct image.

SUMMARY OF THE INVENTION

It is an object of the present invention to provide an image pickup unit which is made in a compact size but capable of producing vivid images.

In present invention, the image pickup unit comprises a light source, an image-forming means, image pickup elements, a housing, and a board.

The light source for emits a light to a target surface of an object at a fixed angle to a direction normal to the target surface. The image-forming means is mounted at such an angle as to receive a maximum quantity of reflected light from the target surface, and forms an image at a specified image-forming position. The image pickup elements receive the reflected light converged at the image-forming position and convert the reflected light into an electric signal. The light source, the image-forming means, and the image pickup elements are arranged in the housing. The image pickup elements are mounted on the board, and the board is arranged in the housing in parallel with the target surface.

By adopting the configuration described above, the space between two walls of the housing which are parallel with the target surface of the object can be reduced, so that the housing itself can be reduced in size.

Because the image-forming means is arranged at such an angle as to receive a maximum quantity of the reflected light, distinct images can be obtained by the image pickup elements.

According to a second embodiment of the present invention, an image pickup unit comprises a light source, an image-forming means, image pickup elements, a housing and a board.

The light source emits a light to a target surface of an object at a fixed angle to a direction normal to the target surface. The image-forming means is mounted at such an angle as to receive a maximum quantity of reflected light from the target surface, and forms an image at a specified image-forming position. The image pickup elements receive the reflected light converged at the image-forming position and convert the reflected light into an electric signal. The light source, the image-forming means, and the image pickup elements are arranged in the housing. The image pickup elements are mounted on the board, and the board is arranged in the housing in a direction at right angles to the target surface.

By adopting the configuration shown in the second embodiment, the space between two walls of the housing, each of which lies in a direction at right angles to the target surface of the object, can be reduced, with the result that the housing itself can be reduced in size.

Like in the first embodiment, because the image-forming means is arranged at such an angle as to receive a maximum quantity of the reflected light, vivid images can be obtained by the image pickup elements.

In the first and the second embodiments, that portion of the board where the image pickup elements are mounted may be bent to orient the light-receiving faces of the image pickup elements at right angles to the propagating direction of the reflected light. By this arrangement, the image pickup elements can be positioned correctly at the image-forming means merely by moving the board in one direction along the wall.

In the first and the second inventions, it is possible to arrange another board for mounting the light source in a direction at right angles to the target surface and install a reflector to reflect the emitted light of the light source at a fixed angle. By this arrangement, the other board, which was inclined, is now arranged in parallel with the wall opposite the wall on which the other board is mounted, so that the housing can be further reduced in size.

DETAILED DESCRIPTION OF THE PREFERRED EMBODIMENTS

[First Embodiment]

Figure 1:
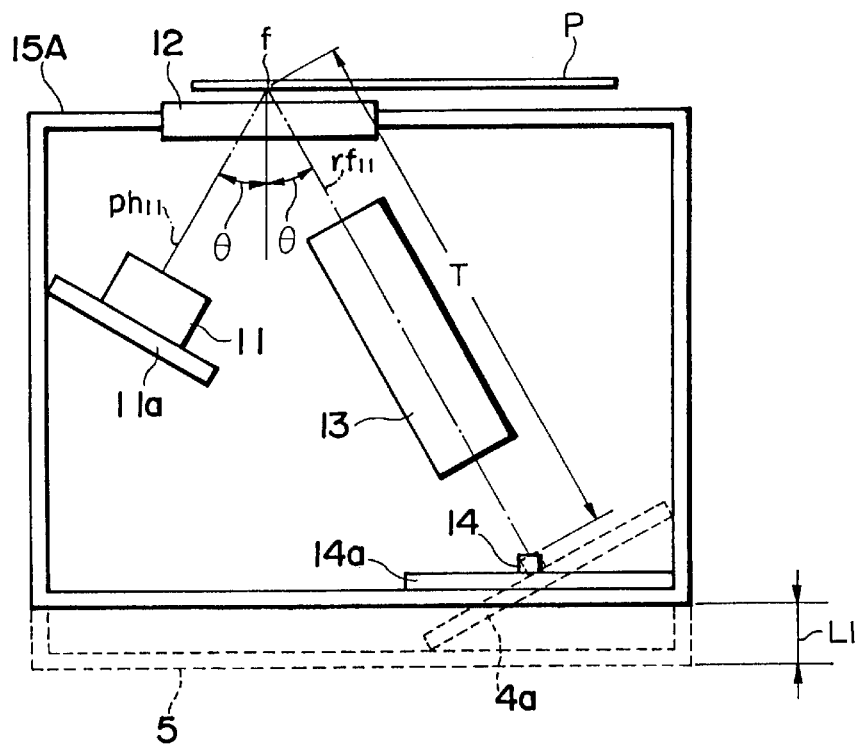
FIG. 1 is a sectional view of the image pickup unit according to a first embodiment of the present invention.

FIG. 1 is a sectional view of the image pickup unit showing a first embodiment of the present invention.

A light source 11 formed of a plurality of light emitters arranged in a row is provided at a position a specified distance away from the target surface of the original P as the object. The light source 11 emits the light ph11 in a linear form to the target surface at a specified angle $\theta(0° < \theta < 90°)$ to a direction normal to the target surface. The light source 11 is mounted on a board 11a and located at a proper position in a housing 15A. The emitted light ph11 passes through a glass plate 12 and is incident on the focal points f of a rod lens array 13 on the target surface of the original P at an incidence angle $\theta$, and is reflected at a reflection angle $\theta$ by the target surface as a reflected light rf11 in a linear form. In the propagating direction of the reflected light rf11, the rod lens array 13 is provided as the image-forming means for converging the reflected light rf11 to form an image at the image-forming position at a conjugate distance T from the target surface. At the image-forming position of the rod lens array 13, a plurality of image pickup elements 14 are provided which receive on their light-receiving faces the reflected light rf11 converged by the rod lens array 13, and convert the reflected light rf11 into electric signals. The image pickup elements 14 are mounted on the board 14a such that their light-receiving faces are in parallel with the target surface of the original P, while on the other hand the board 14a is fixed directly to the bottom wall of the housing 15A so as to be parallel with the target surface.

Figure 2:
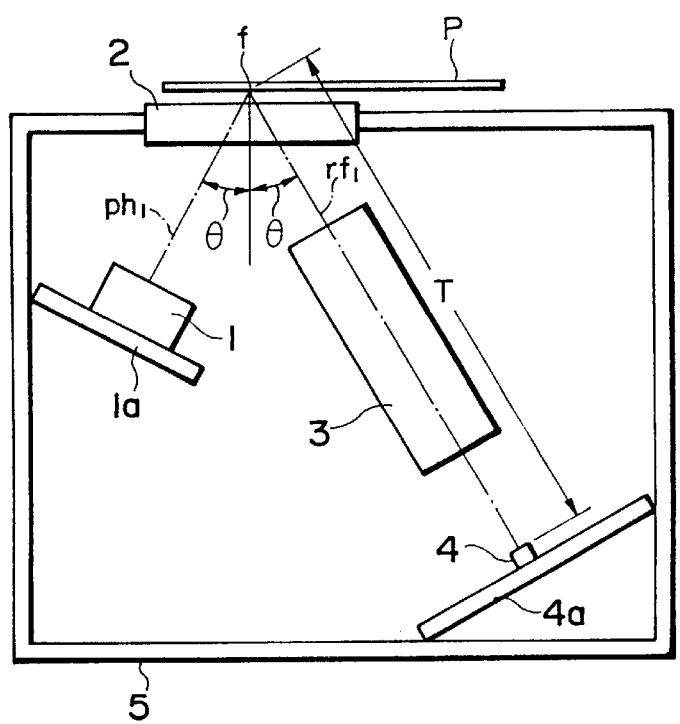
FIG. 2 is a sectional view of the conventional specular reflection type image pickup unit.
Figure 3:
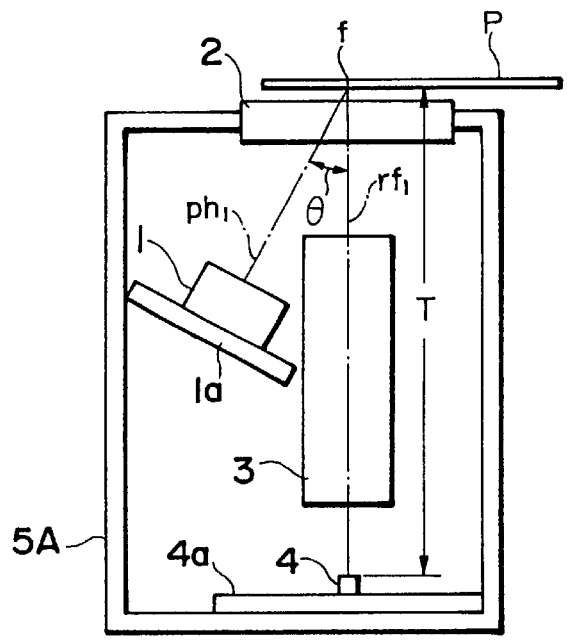
FIG. 3 is a sectional view of the conventional irregular reflection type image pickup unit.

In FIG. 1, for a comparison with the prior-art example in FIG.2, the board 4a and the housing 5 in FIG. 2 are shown by the broken lines. As shown in FIG. 1, since the board 14a is arranged in parallel with the housing wall, the housing 15A has the height made lower by L1 in the housing 15A than in the housing 5.

In this image pickup unit, light ph11 in a linear form is emitted from the light source 11 at an angle $\theta$ to a direction normal to the target surface of the original P. The emitted light ph11 passes through the glass plate 12 and is incident on the focal points f of the rod lens array 13 on the target surface of the original P at an incidence angle $\theta$, and is reflected by the target surface as a reflected light rf11 in a linear form at a reflection angle $\theta$ at which the received quantity of the reflected light is maximum. The reflected light rf11 is converged by the rod lens array 13 to form an image at the image-forming position at a conjugate distance T across the rod lens array 13 from the target surface. The reflected light rf11 which formed the image plane is converted by the image pickup elements into electric signals. The electric signals are sent through the board 14a to an image processing system, for example, to undergo a specified process.

As described above, in the first embodiment, because the board 14a is arranged so as to be in parallel with the housing wall and fixed to the bottom wall of the housing 15A, the height of the housing 15A is made lower by L1.

[Second Embodiment]

Figure 4:
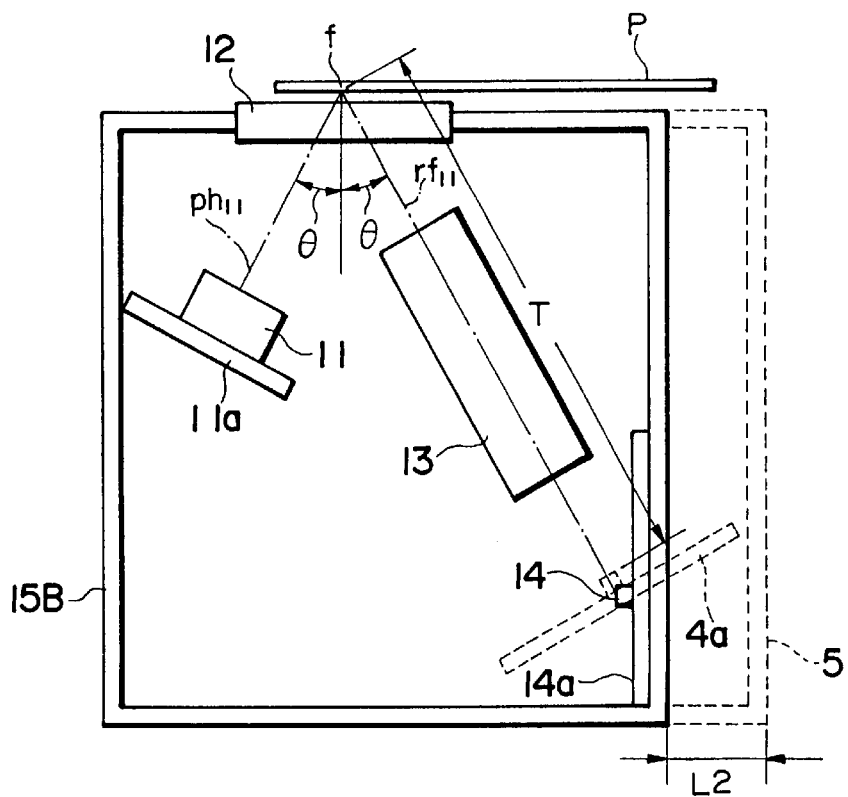
FIG. 4 is a sectional view of the image pickup unit according to a second embodiment of the present invention.

FIG. 4 is a sectional view of the image pickup unit according to a second embodiment of the present invention, and the parts which are identical with those used in the first embodiment shown in FIG. 1 are designated by the common reference numerals.

This image pickup unit uses a housing with a smaller width dimension in place of the housing 15A in FIG. 1. The image pickup elements 14 have their light-receiving faces arranged in a direction at right angles to the target surface of the original P, and the board 14a is arranged at a right angle to the target surface and fixed directly to the right-side wall of the housing 15B. As shown in FIG. 4, because the housing 15B has the board 14a arranged in a direction at a right angle to the target surface, the width of the housing 15B is smaller by L2 than the housing 5.

In this image pickup unit, like in FIG. 1, the light ph11 is emitted from the light source block 11, and is reflected by the target surface as a reflected light rf11. The reflected light rf11 is converged by the rod lens array 13 to form an image at the image-forming position. The reflected light rf11 which formed the image is converted by the image pickup elements 14 into electric signals, and the electric signals are sent through the board 14a to an image processing system, for example, to be subjected to a specified process.

As has been described, according to the second embodiment, the board 14a is arranged in a direction at a right angle to the target surface of the original P and fixed to the right-side wall of the housing 15B, so that the size of the housing 15B can be decreased.

[Third Embodiment]

Figure 5:
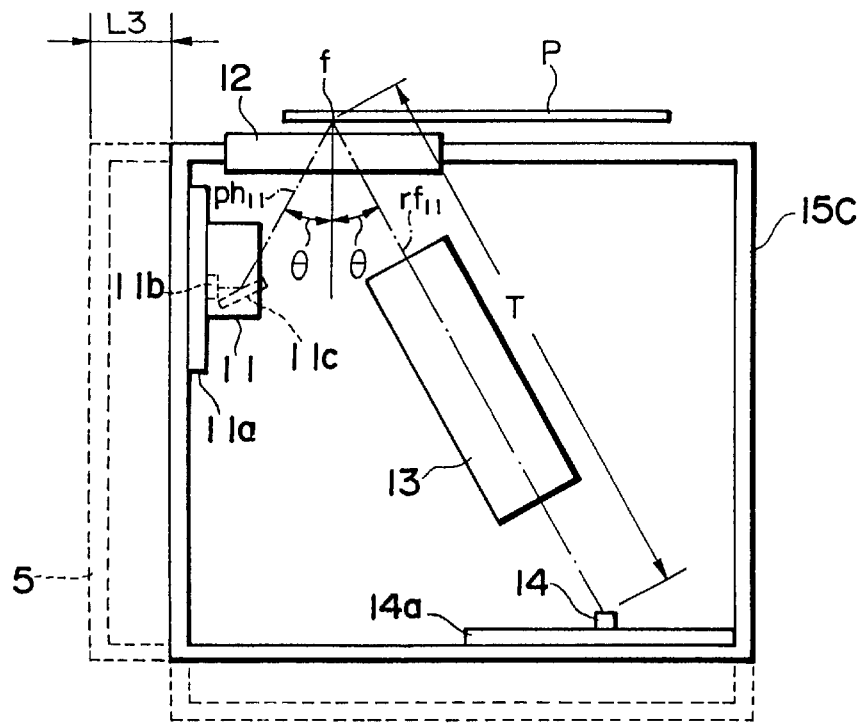
FIG. 5 is a sectional view of a third embodiment of the present invention.

FIG. 5 is a sectional view of the image pickup unit according to a third embodiment of the present invention and therefore the same parts as those in FIG. 1 are designated by the common reference numerals.

This image pickup unit uses a housing 15C with a lower height and a smaller width instead of the housing 15A in FIG. 1. The light source 11 includes a light emitter portion 11b to emit light and a reflection means, a mirror 11c for example, for reflecting the light emitted from the light emitter portion 11b in the direction of an angle $\theta$ to send an outgoing light ph11. At the position of the light source 11, the board 11a is arranged in a direction at right angles to the target surface so that the propagating direction of the light emitted from the light emitter portion 11b is parallel with the target surface of the original P. The board 11a is fixed directly to the left-side wall of the housing 15C. The image pickup elements 14 are mounted on the board 14a. The board 14a, like in FIG. 1, is arranged in parallel with the target surface, and fixed directly to the bottom wall of the housing 15C. Therefore, the height of the housing 15C is smaller by L1 and the width is smaller by L3 than in the housing 5.

In this image pickup unit, the light emitted from the light emitter portion 11b is reflected by the mirror 11c, and emitted as the outgoing light ph11. After this, like in FIG. 1, the light ph11 is reflected by the target surface as a reflected light rf11, and the reflected light rf11 is converged by the rod lens array 13 to form an image at the image-forming position. The reflected light rf11 which formed the image plane is converted into electric signals, and the electric signals are sent through the board 14a to an image processing system, for example, to be subjected to a specified process.

[Fourth Embodiment]

Figure 6:
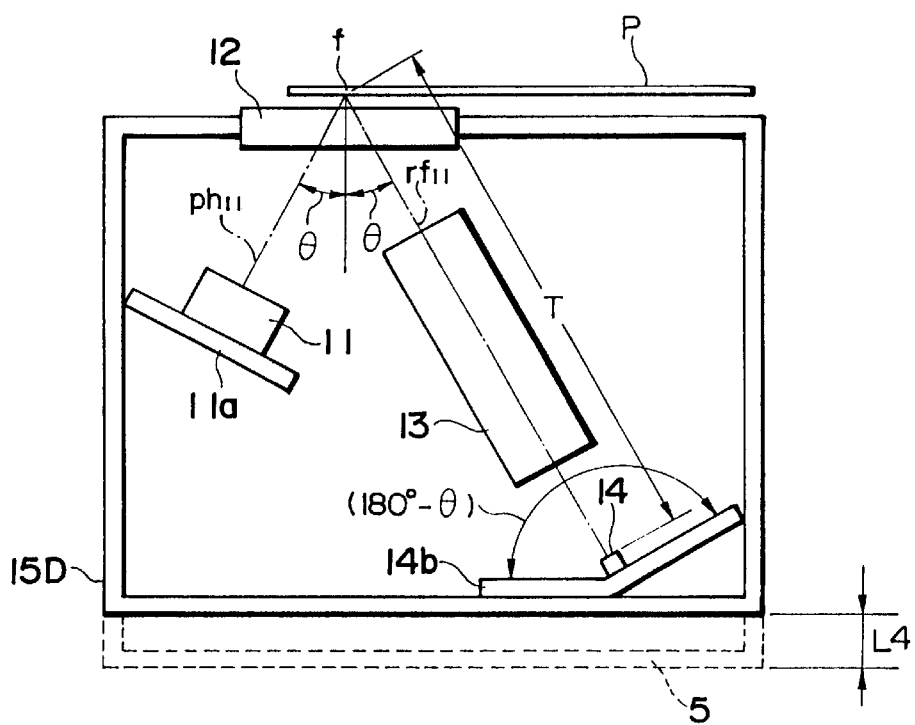
FIG. 6 is a sectional view of a fourth embodiment of the present invention.

FIG. 6 is a sectional view of the image pickup unit according to a fourth embodiment of the present invention. The same parts as those in FIG. 1 are designated by the common reference numerals.

In this image pickup unit, a housing 15D with a lower height is used instead of the housing 15A in FIG. 1. The image pickup elements 14 are fixed to the bent portion of the board 14b so that their light-receiving faces can be oriented in the propagating direction of the reflected light rf11. The board 14b is formed by bending so that the bent portion of the board 14b which holds the image pickup elements 14 forms an included angle (180°−θ) with the other portion of the board 14b, so that the height of the housing 15D is lower by L4 than the housing 5.

Also in this image pickup unit, like in FIG. 1, the emitted light ph11 from the light source is reflected by the target surface as a reflected light rf11. The reflected light rf11 is converged by the rod lens array 13 to form an image at the image-forming position. The reflected light rf11 which formed the image is converted by the image pickup elements 14 into electric signals, and the electric signals are sent via the board 14b to an image processing system or the like to undergo a required process. In FIG. 1 showing the first embodiment, the light-receiving faces of the image pickup elements 14 are inclined by an angle (90°−θ) from the propagating direction of the reflected light rf11. Therefore, It is difficult to position the board 14a so as to arrange the light-receiving faces of the image pickup elements at the specified positions.

In contrast, in the fourth embodiment, because the light-receiving faces of the image pickup elements 14 are oriented in the propagating direction of the reflected light, even when the board 14b is moved to some extent, the reflected light rf11 can be made to securely strike the light-receiving faces. Therefore, it is easy to perform positioning of the board (image pickup elements).

[Fifth Embodiment]

Figure 7:
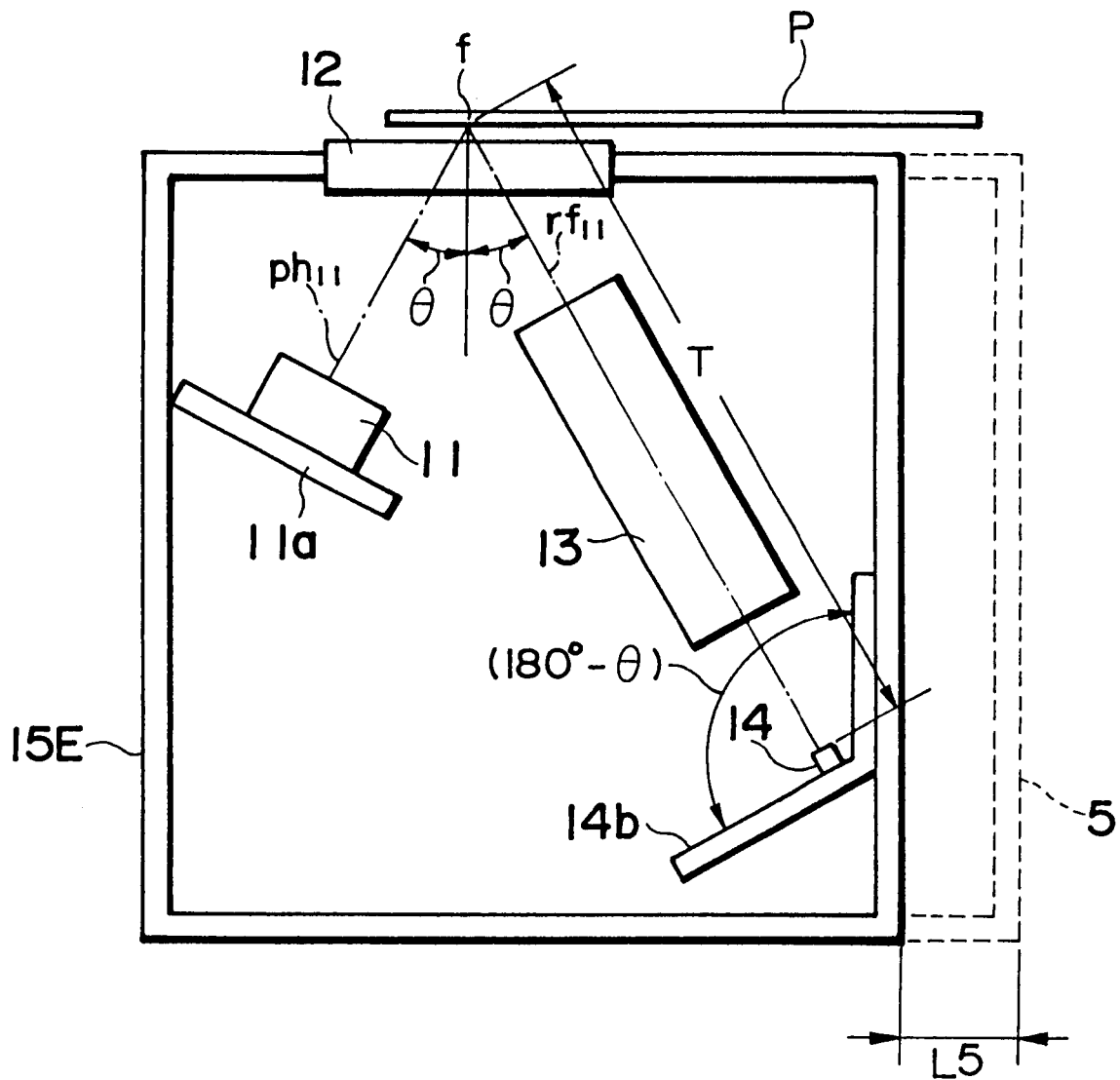
FIG. 7 is a sectional view of a fifth embodiment of the present invention.

FIG. 7 is a sectional view of the image pickup unit according to a fifth embodiment of the present invention. The same parts as those in FIG. 6 are designated by the common reference numerals.

In this image pickup unit, a housing 15E with a smaller width is used. The image pickup elements 14 are mounted at the bent portion of the board 14b so that the light-receiving faces of the image pickup elements 14 are at right angles to the propagating direction of the reflected light rf11. The board 14b is fixed to the right-side wall of the housing 15E. Therefore, the width of the housing 15E is smaller by L5 than that of the housing 5.

In this image pickup unit, like in FIG. 1, the light ph11 emitted from the light source 11 is reflected by the target surface as the reflected light rf11. The reflected light rf11 is converged by the rod lens array 13 to form an image at the image-forming position. The reflected light rf11 which formed the image is converted by the image pickup elements 14 into electric signals, and the electric signals are sent through the board 14b to an image processing system, for example, to undergo a required process. In this fifth embodiment, like in the fourth embodiment, positioning of the image pickup elements 14 is easy to perform and the reflected light rf11 can be made to securely strike the light-receiving faces.

As has been described, according to the fifth embodiment, the image pickup elements 14 are mounted at the bent portion of the board 14b so that the light-receiving faces are oriented in the propagating direction of the reflected light rf11. Therefore, it is possible to position the image pickup elements 14 easily and accurately, and apply the reflected light rf11 to the light-receiving faces securely.

The present invention is not limited to the above-mentioned embodiments, but can be carried out in various ways.

Some variations are shown in the following.

(a) The board 11a, 14a or 14b, after being arranged as described above, may be supported with support means in the housing.

(b) The housing 15A, 15B, 15C, 15D or 15E may be structured as a monolithic body by forming that portion 12 described as made of glass plate by a light transmitting plastic or the like.

(c) The third embodiment may be carried out in combination with the first, second, fourth or fifth embodiment.

As described above, according to the present invention, the image-forming means is arranged at such an angle as to receive the maximum quantity of reflected light, and the board on which the image pickup elements are mounted is arranged in a direction parallel with or at right angles to the target surface, with the result that the external dimensions of the housing can be reduced and distinct images can be obtained.

What is claimed is:

1. An image-pickup unit comprising:

a light source for emitting light to a target surface of an object at a fixed incidence angle with respect to a direction normal to the target surface;

an image-forming mechanism mounted at a reflection angle with respect to the direction normal to the target surface so as to receive a maximum quantity of reflected light from said target surface, said reflection angle being equal to said incidence angle, said image-forming mechanism being adapted to converge the reflected light and form an image at a specified image-forming position;

image-pickup elements for receiving the reflected light converged at said image-forming position and for converting the reflected light into an electric signal;

a housing accommodating said light source, said image-forming mechanism, and said image-pickup elements; and a board on which said image-pickup elements are mounted, said board being arranged in said housing parallel to the target surface and such that a non-orthogonal angle is formed between the reflected light and a surface of said board.

2. An image-pickup unit according to claim 1, wherein said board comprises a first board, further comprising:

a second board on which said light source is mounted, said second board being arranged in said housing at a right angle to the target surface so that the light is emitted from said light source parallel to the target surface; and a reflector for reflecting said emitted light at said fixed incidence angle.

3. An image-pickup unit comprising:

a light source for emitting light to a target surface of an object at a fixed angle with respect to a direction normal to the target surface;

an image-forming mechanism mounted at such an angle as to receive a maximum quantity of reflected light from the target surface, said image-forming mechanism being adapted to form an image at a specified image-forming position;

image-pickup elements for receiving the reflected light converged at said image-forming position and for converting the reflected light into an electric signal;

a housing in which said light source, said image-forming mechanism, and said image-pickup elements are arranged; and a board on which said image-pickup elements are mounted and which is arranged in said housing parallel to the target surface, wherein a portion of said board where said image-pickup elements are mounted is bent to orient light-receiving faces of said image-pickup elements at right angles to a propagating direction of said reflected light.

4. An image-pickup unit according to claim 3, wherein said board comprises a first board, further comprising:

a second board on which said light source is mounted, said second board being arranged in said housing at a right angle to the target surface so that the light is emitted from said light source parallel to the target surface; and a reflector for reflecting said emitted light at said fixed incidence angle.

5. An image-pickup unit comprising:

a light source for emitting light to a target surface of an object at a fixed incidence angle with respect to a direction normal to the target surface;

an image-forming mechanism mounted at a reflection angle with respect to the direction normal to the target surface so as to receive a maximum quantity of reflected light from said target surface, said reflection angle being equal to said incidence angle, said image-forming mechanism being adapted to converge the reflected light and form an image at a specified image-forming position;

image-pickup elements for receiving the reflected light converged at said image-forming position and for converting the reflected light into an electric signal;

a housing accommodating said light source, said image-forming mechanism, and said image-pickup elements; and a board on which said image-pickup elements are mounted, said board being arranged in said housing at a right angle to the target surface and such that a non-orthogonal angle is formed between the reflected light and a surface of said board.

6. An image-pickup unit according to claim 5, wherein said board comprises a first board, further comprising:

a second board on which said light source is mounted, said second board being arranged in said housing at a right angle to the target surface so that the light is emitted from said light source parallel to the target surface; and a reflector for reflecting said emitted light at said fixed incidence angle.

7. An image-pickup unit comprising:

a light source for emitting light to a target surface of an object at a fixed angle with respect to a direction normal to said target surface;

an image-forming mechanism mounted at such an angle as to receive a maximum quantity of reflected light from the target surface, said image-forming mechanism being adapted to form an image at a specified image-forming position;

image-pickup elements for receiving the reflected light converged at said image-forming position and for converting the reflected light into an electric signal;

a housing in which said light source, said image-forming mechanism, and said image-pickup elements are arranged; and a board on which said image-pickup elements are mounted and which is arranged in said housing at right angles to the target surface, wherein a portion of said board where said image-pickup elements are mounted is bent to direct light-receiving faces of said image-pickup elements in a direction at right angles to a propagating direction of said reflected light.

8. An image-pickup unit according to claim 7, wherein said board comprises a first board, further comprising:

a second board on which said light source is mounted, said second board being arranged in said housing at a right angle to the target surface so that the light is emitted from said light source parallel to the target surface; and a reflector for reflecting said emitted light at said fixed incidence angle.

* * * * *